(12) United States Patent
Grone

(10) Patent No.: US 8,591,156 B2
(45) Date of Patent: Nov. 26, 2013

(54) PORTABLE AND REMOVABLE ANCHOR FOR TRUCK BED SLOTS

(75) Inventor: Todd Grone, Phoenix, AZ (US)

(73) Assignee: Maaj Research and Development, Phoenix, AZ (US)

( * ) Notice: Subject to any disclaimer, the term of this patent is extended or adjusted under 35 U.S.C. 154(b) by 87 days.

(21) Appl. No.: 13/079,130

(22) Filed: Apr. 4, 2011

(65) Prior Publication Data

US 2012/0189398 A1 Jul. 26, 2012

Related U.S. Application Data

(60) Provisional application No. 61/333,209, filed on May 10, 2010.

(51) Int. Cl.
 *B60P 7/08* (2006.01)
(52) U.S. Cl.
 USPC ............................ 410/105; 410/104; 410/106
(58) Field of Classification Search
 USPC .......... 410/102, 104, 105, 106, 110, 116, 97; 24/115 K, 265 CD; 248/499
 See application file for complete search history.

(56) References Cited

U.S. PATENT DOCUMENTS

| | | | | |
|---|---|---|---|---|
| 2,422,693 | A | * 6/1947 | McArthur | ..................... 410/116 |
| 2,609,761 | A | 9/1952 | Clark | |
| 2,376,272 | A | 2/1956 | Elsner | |
| 3,860,209 | A | 1/1975 | Strecker | |
| 3,860,263 | A | 1/1975 | Taylor | |
| 4,630,982 | A | * 12/1986 | Fenner | .......................... 410/102 |
| 4,812,093 | A | 3/1989 | Millar, Jr. | |
| 4,969,784 | A | 11/1990 | Yanke | |
| 5,259,711 | A | 11/1993 | Beck | |
| 5,738,471 | A | 4/1998 | Zentner | |
| 6,644,901 | B2 | 11/2003 | Breckel | |
| 6,827,531 | B2 | 12/2004 | Womack | |

OTHER PUBLICATIONS

Keeper 05604 2" Chrome Ring Stake Pocket Anchor; http://www.amazon.com/Keeper-05604-Chrome-Pocket-Anchor/ . . . ; Apr. 26, 2010.
Bedbolts/Bed Anchor with Removable Eye Bolt; Apr. 26, 2010.
Chrome Ring Stake Pocket Anchor Tie Down; http://www.trucknvans.com/Chrome-Ring-Stake-Pocket-Anchor-Tie-Down-p/tnv05604.htm; Mar. 10, 2011.

* cited by examiner

*Primary Examiner* — Stephen Gordon
(74) *Attorney, Agent, or Firm* — Michael P. Mazza

(57) ABSTRACT

An apparatus and method for providing a removable anchor for use in tying down a load, or for securing a winch cable for use in recovering a disabled vehicle or other load. The anchor may be removably attached to the deck/bed of a trailer or vehicle (e.g., a car carrier or wrecker/tow truck), using one or more slots or stake pockets located on a cargo surface of the deck. The removable anchor may include: a projection member shaped and sized to fit into a slot on the cargo surface, or to protrude through a stake pocket; a crown attached to, or integrally forming a part of, the projection member, and configured to receive and anchor one or more tie-down connectors; and a key attached to, or integrally forming a part of, the projection member. The key can be passed into the slot and manipulated between removable and locked positions. Alternatively, the key may be used to removably secure the anchor to the stake pocket.

10 Claims, 10 Drawing Sheets

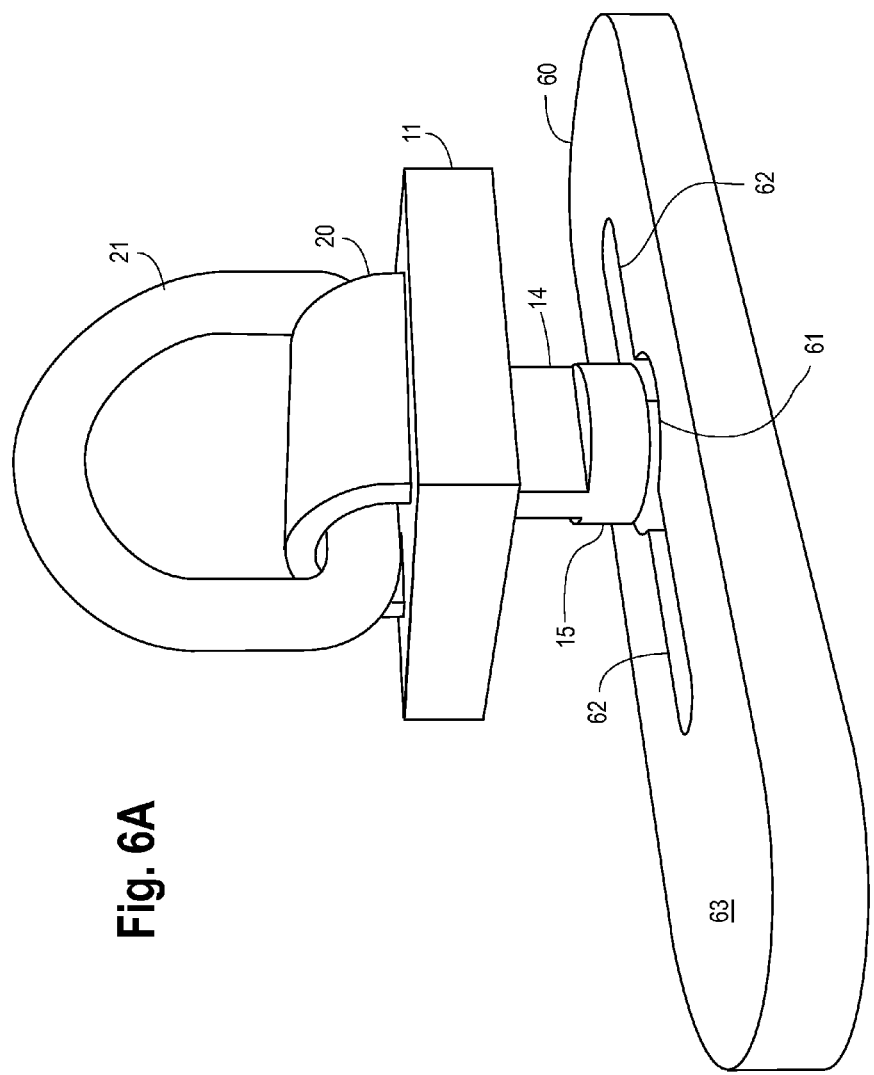

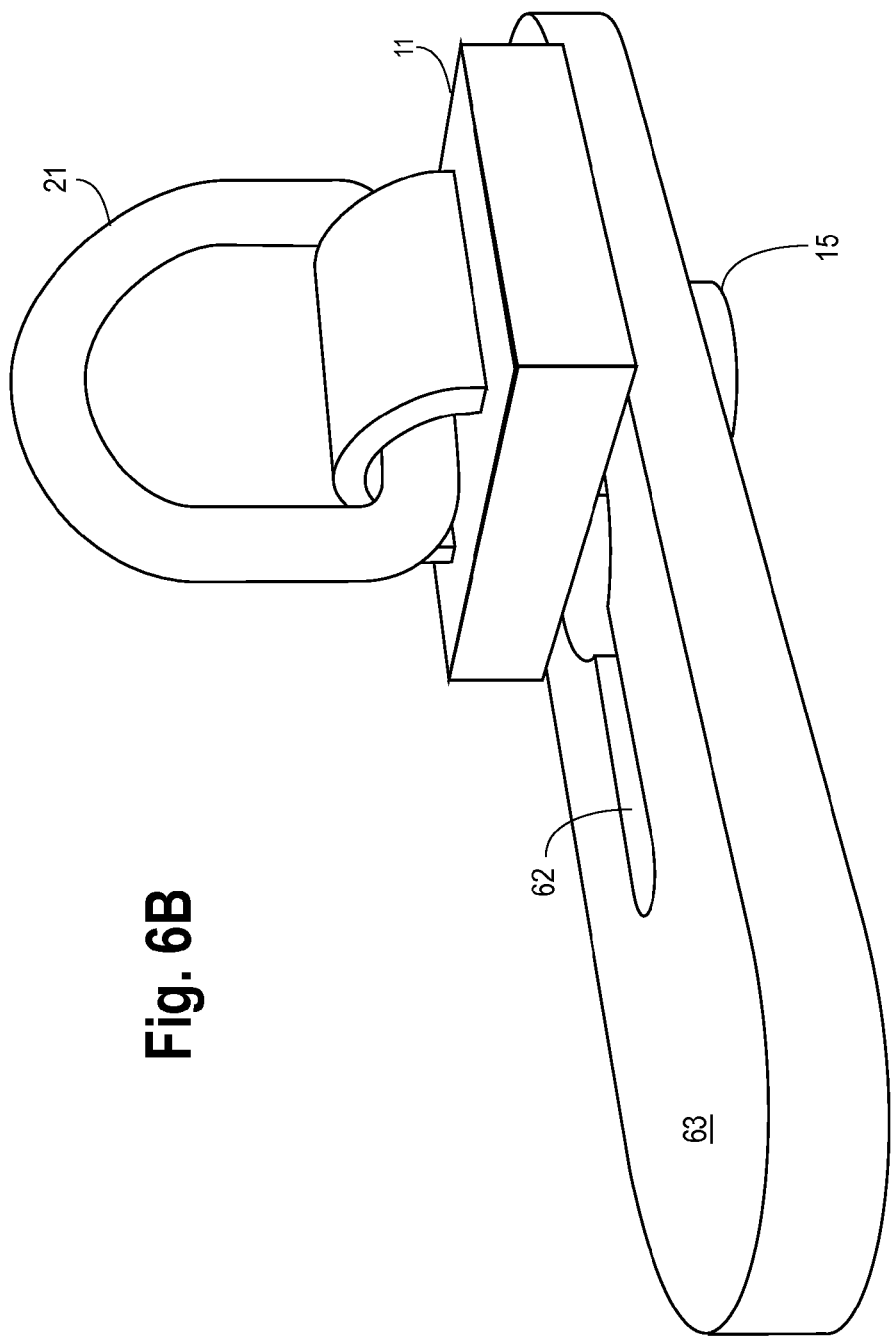

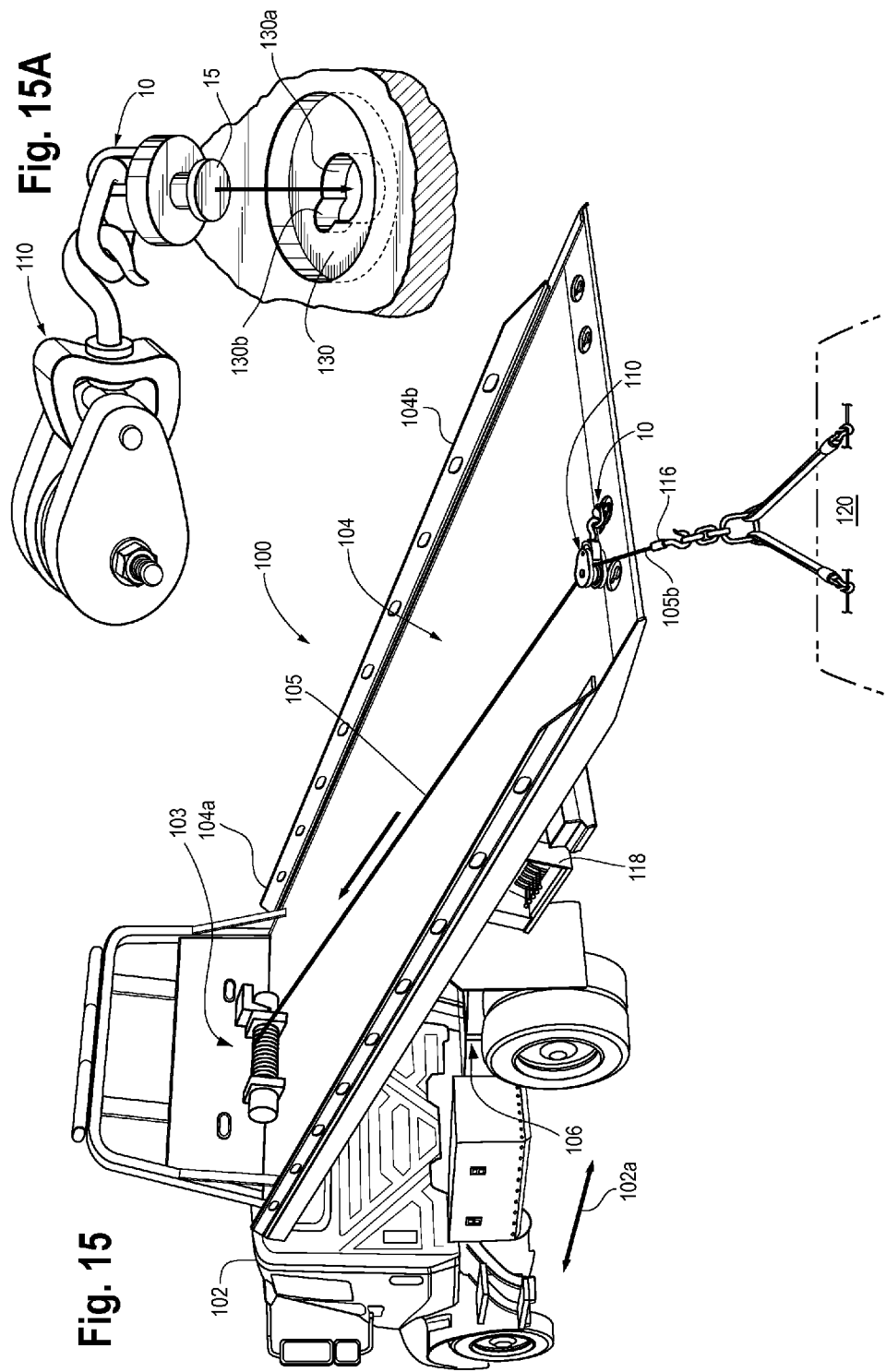

PORTABLE AND REMOVABLE ANCHOR FOR TRUCK BED SLOTS

PRIORITY CLAIM TO CO-PENDING PROVISIONAL PATENT APPLICATION

This application claims priority from a provisional patent application with the same title, U.S. Ser. No. 61,333,209, filed May 10, 2010.

FIELD OF THE INVENTION

This invention relates to cargo tie-down apparatuses. This invention relates particularly to a removable apparatus for securing cargo on a transportation surface.

BACKGROUND

Heavy cargo transporters, such as vehicle and equipment towing enterprises, use cargo carriers with large, substantially flat cargo carrier surfaces. Cargo must be secured to the carrier surface for loading, unloading, and transport. This is accomplished with tie-down anchors, such as d-rings, that are attached to and project above the carrier surface. Typically, the anchors are permanently attached to the carrier surface by welds or nut-and-bolt assemblies. This permanent attachment interferes with loading, unloading, and transport of cargo, particularly in heavy cargo transports where the anchors may project several inches above the carrier surface. It would be advantageous to provide a tie-down anchor that can be attached to the carrier surface only when needed, to prevent interferences with loading, unloading, and transport. Because such an anchor would only be used when needed, it would be further advantageous for the anchor to be fast and easy to install.

Solutions to this problem have been approached for light cargo transporters, such as pickup trucks. It is known to modify a pickup truck bed by drilling holes in it and mounting removable tie-down anchors in the new holes. This approach is not feasible for the transport of heavy cargo because the carrier surface is thicker and stronger, making drilling impractical. Additionally, the anchors that could be mounted in a drilled hole are not strong enough to restrain heavy cargo. Indeed, typical heavy cargo transporters have existing slots in the carrier surface for mounting other attachments, such as guard rails or strap hooks. It would be advantageous to have a removable anchor that can use these existing slots.

It would also be advantageous to provide such removable anchors on cargo surfaces for use with other tie-down apparatus. It would also be useful to provide removable anchors to facilitate guiding winch cables in various orientations off of the platform of a vehicle carrier, for example, such as by using snatch blocks connected to the winch cable and also attached to the anchors to provide pulling assistance.

Therefore, it is an object of this invention to provide an apparatus for securing cargo on a transportation surface, such as a trailer or vehicle carrier or wrecker. It is a further object that the apparatus be insertable and removable as needed. It is a further object that the apparatus be configured to use existing slots in the transportation surface. Another object of this invention is to provide a removable securing apparatus that is strong enough to retain heavy cargo. A further object is to provide a device for anchoring cargo tie-downs that is damage resistant and simple to install.

Accordingly, it would be advantageous to provide an apparatus and method which solves the above referenced problems while maintaining advantages of such known assemblies and methods.

SUMMARY OF THE INVENTION

The objects mentioned above, as well as other objects, are solved by the present invention, which overcomes disadvantages of prior tie-down systems and methods, while providing new advantages not previously obtainable with such systems and methods.

A removable anchor for use with a load-securing mechanism, such as one or more tie-down connectors attached to one or more tie-down cords, or for use with snatch blocks or other towing apparatus.

In one embodiment, the removable anchor may be configured to be inserted into and removed from one or more existing slots on a cargo carrier surface such as a the bed of a trailer, vehicle carrier or wrecker/tow truck. A projection member, fitting into the slot but being longer than the slot is deep, connects a crown above the carrier surface to a key below the surface. The crown may have a width that prevents it from slipping into the slot. The crown may be configured to receive a tie-down connector for retaining the tie-down cord. The tie-down connector may be permanently or removably attached to the crown. The key may be designed to be passed through the slot and then manipulated to retain the anchor in the slot. In some embodiments, the anchor may be slid or rotated into a "locked" position, in which the key cannot pass back through the slot. In other embodiments, the key may be inserted into the projection member so that it cannot pass back through the slot. The crown, projection member, and key are preferably integrally cast in steel.

In a preferred embodiment, a removable anchor is provided for use in tying down a load supported by a trailer or vehicle carrier by using one or more tie-down cords connected to the anchor by one or more tie-down connectors. The trailer or vehicle carrier may have one or more slots located on a cargo surface. The anchor may include: a projection member shaped and sized to fit into a slot on the cargo surface; a crown attached to, or integrally forming a part of, the projection member, the crown being configured to receive and anchor the one or more tie-down connectors for use in the retaining one or more tie-down cords; and a key attached to, or integrally forming a part of, the projection member, the key being configured to be passed into the slot and the key being manipulable between at least a first, removable key position in which the anchor can be readily removed from the slot, and at least a second, locked key position in which the anchor is retained in the slot and resists an external pulling force exerted on the anchor.

In a particularly preferred embodiment, the projection member may have a width less than the width of the slot, allowing the anchor to slide or rotate in the slot. The projection member may also have a length greater than a depth of the slot, thereby enabling the key to secure the anchor against an underside of the cargo surface adjacent the slot. The key may be permanently or removably attached to the projection member.

A top surface of the crown may be configured to receive one or more of the tie-down connectors. A lower surface of the crown may be configured to contact and substantially lie flush with the cargo surface adjacent the slot. The slot may have a slot insertion area having a slot insertion width, and a slot locking area having a slot locking width, and the key may have a width that is wider than the width of the slot locking width when the key is in the locked position. The key may also have a width that is narrower than the width of the slot insertion width when the key is in the removable key position. The key may be moved from the removable key position to the locked key position by sliding the key along the slot from the slot insertion area to the slot locking area, and then rotating the key.

In an alternative embodiment, the removable anchor as generally described may be used to secure a winching cable in a preferred orientation using a winching cable guide mechanism, such as one or more snatch blocks, or other towing apparatus, that may connect the anchor to a winch cable, for example.

In an alternative embodiment, a removable anchor may be configured to fit into an existing stake pocket of a vehicle and to connect to one or more tie-down connectors, the anchor being used to tie down a load supported by the vehicle. In this embodiment, a projection member may be provided, shaped and sized to fit into the stake pocket, with a distal portion of the projection member protruding through the stake portion. A crown may be attached to, or integrally form a part of, the projection member, and be configured to attach to the one or more tie-down connectors. A key, such as a bolt passing through apertures in the distal end of the projection member, may be configured to attach to the distal end of the projection member and to removably secure the projection member to the stake pocket.

A method for using a removable anchor also forms part of the present invention, and may be used in order to anchor a load supported by a vehicle, such as for anchoring a load-securing mechanism such as tie-down cords connected to the anchor by one or more tie-down connectors. With this method, the vehicle may have one or more slots located on a cargo surface of the vehicle. In the method, the following may be provided: a projection member shaped and sized to fit into a slot on the cargo surface; a crown attached to, or integrally forming a part of, the projection member, the crown being configured to receive and anchor the one or more tie-down connectors for use in retaining the one or more tie-down cords; and a key attached to, or integrally forming a part of, the projection member. The key may be inserted into the slot and the key may then be manipulated from a removable key position in which the anchor can be readily removed from the slot, to a locked key position in which the anchor is removably retained in the slot and resists an external pulling force on the anchor.

In an alternative method of the present invention, a removable anchor is used to tie down a load supported by a vehicle using one more tie-down cords connected to the anchor by one or more tie-down connectors, in which the vehicle has one or more stake pockets located on a cargo surface of the vehicle. With this method the following may be provided: a projection member shaped and sized to fit into a stake pocket, with a distal portion of the projection member protruding through the stake portion; a crown attached to, or integrally forming a part of, the projection member, with the crown being configured to receive and anchor the one or more tie-down connectors for use in retaining the one or more tie-down cords; and a key for removably securing the distal end of the projection member to the stake pocket. The key may be connected to the distal end of the projection member, to thereby removably secure the anchor to the stake pocket. The anchor may now be removably engaged to the stake pocket and capable of resisting an external pulling force on the anchor.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 6A is a top perspective view showing the embodiment of FIG. 5 positioned over a key slot;

FIG. 6B is a top perspective view showing the embodiment of FIG. 5 in a locked position in the key slot;

FIG. 15 is a perspective view showing the removable anchor of the present invention supporting a winching cable guide mechanism (in this case, a snatch block); and FIG. 15A is an enlarged perspective view of the anchor and snatch block.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Set forth below is a description of what are believed to be the preferred embodiments and/or best examples of the invention claimed. Future and present alternatives and modifications to the preferred embodiments are contemplated. Any alternatives or modifications which make insubstantial changes in function, in purpose, in structure, or in result are intended to be covered by the claims of this patent.

Figure 1:
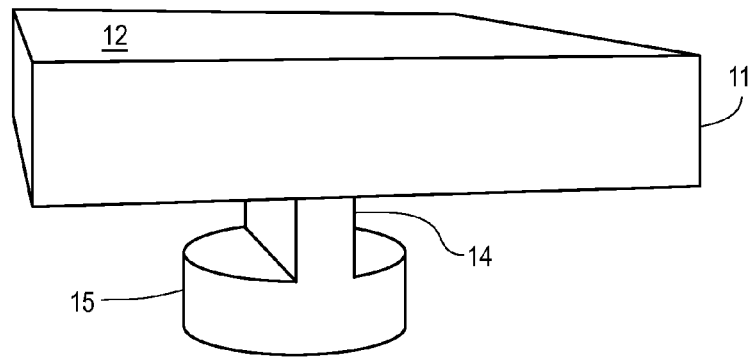
FIG. 1 is a top perspective view of a first embodiment of the invention.
Figure 2:
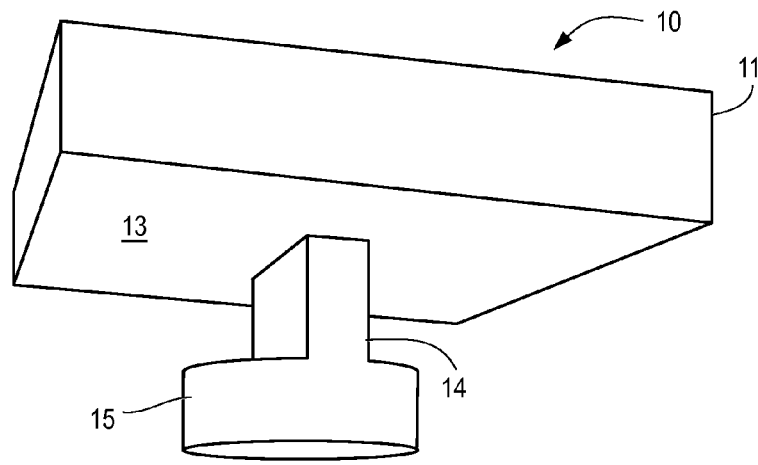
FIG. 2 is a bottom perspective view of the first embodiment.
Figure 3:
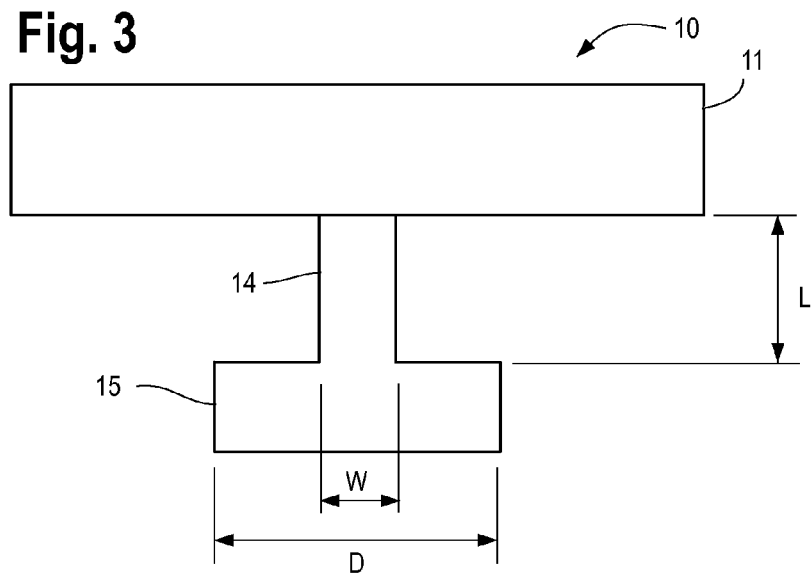
FIG. 3 is a front view of the first embodiment.
Figure 7:
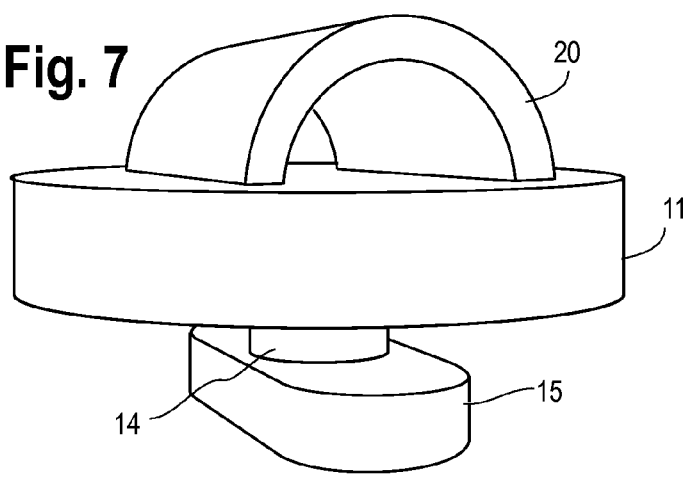
FIG. 7 is a top perspective view of a second embodiment of the invention with a tie-down connector attached to the crown.
Figure 8:
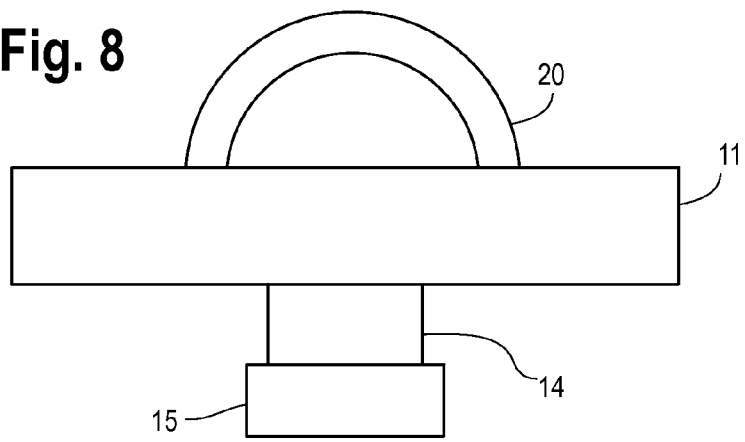
FIG. 8 is a front view of the embodiment of FIG. 7.
Figure 9:
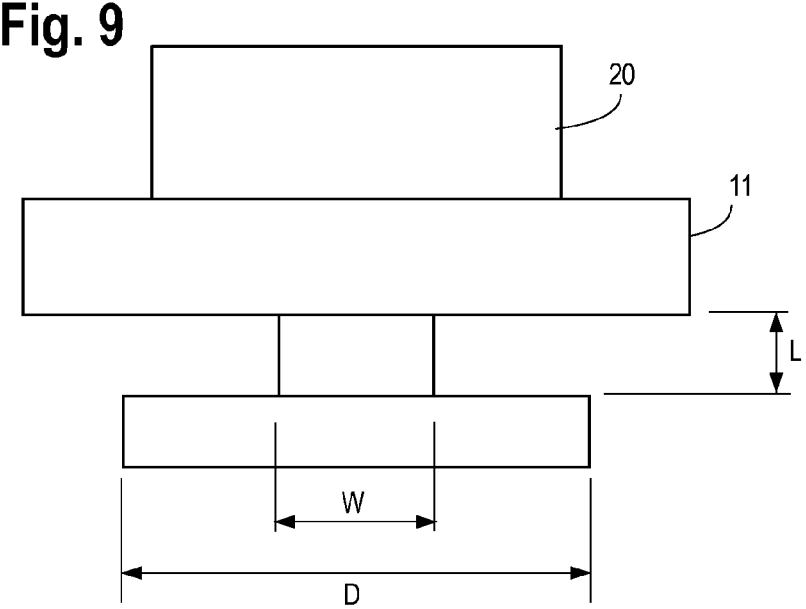
FIG. 9 is a right side view of the embodiment of FIG. 7.
Figure 10A:
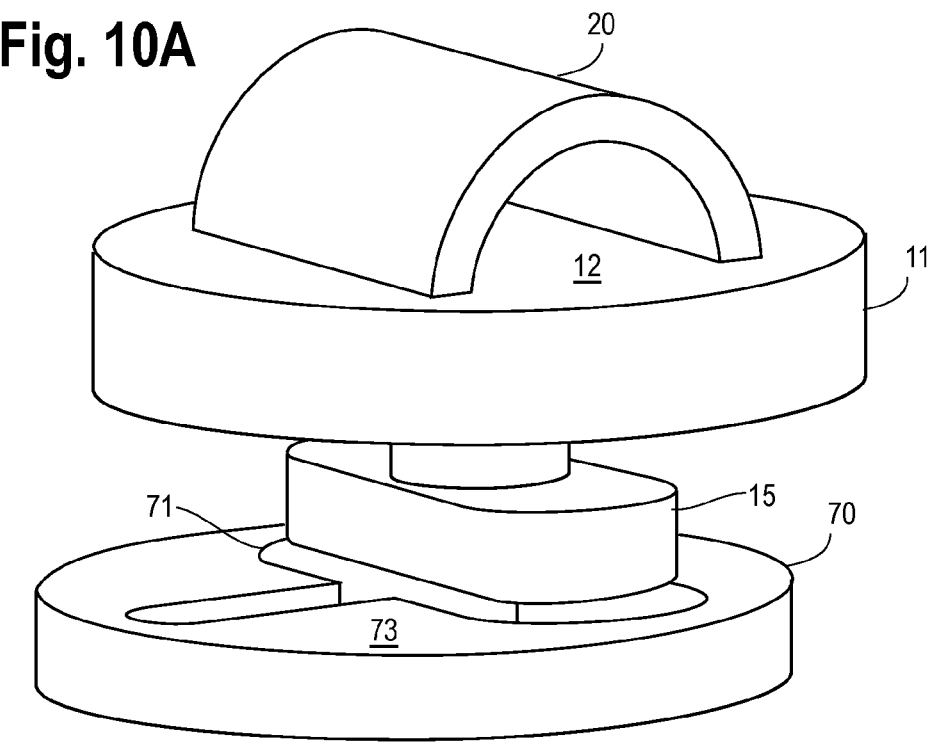
FIG. 10A is a top perspective view showing the embodiment of FIG. 7 positioned over a key slot.
Figure 10B:
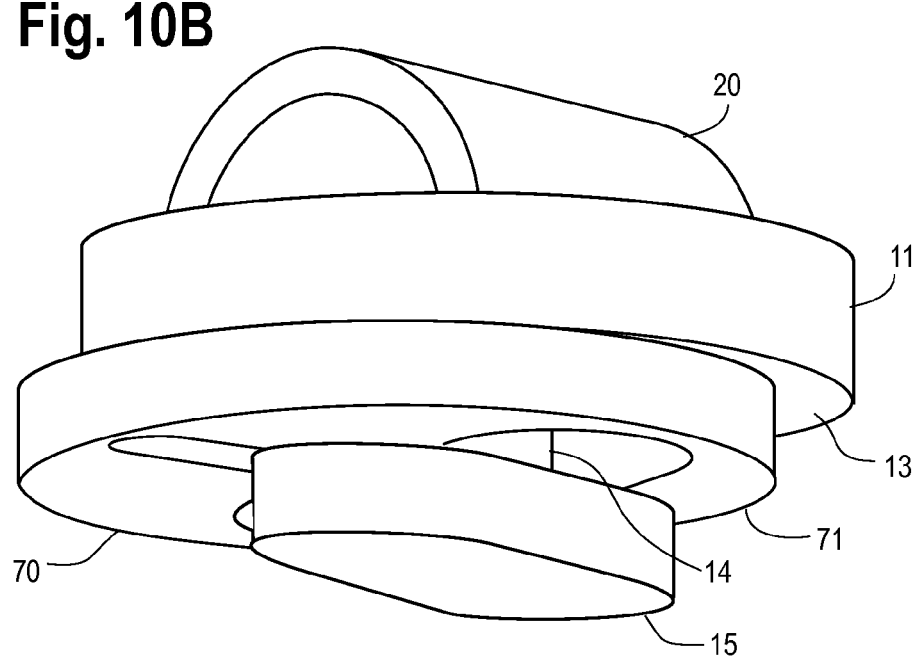
FIG. 10B is a bottom perspective view showing the embodiment of FIG. 7 in a locked position in the key slot.

FIGS. 1-14B illustrate three embodiments of the present invention, designated generally as 10 in FIGS. 1-3. The device 10 is a removable tie-down anchor for use in existing slots in a cargo carrier surface, such as a flatbed tow truck bed or trailer bed. The anchor 10 is preferably used to secure heavy cargo, such as passenger vehicles and construction equipment, during transport. Referring to FIGS. 1-5, the anchor 10 comprises a crown 11 connected to a key 15 via a projection member 14. Crown 11 may be configured to contact, and preferably lie flush with, the carrier surface above the slot. Crown 11 may be any shape that makes stable contact with the carrier surface and provides sufficient surface area for connecting the tie-down connector. For example, the crown 11 may be a square cuboid as in FIGS. 1-5, a cylinder as in FIGS. 7-9, or a rectangular cuboid as in FIGS. 11 and 12, it may also be circular in shape with a similar height to that shown. In any embodiment, the crown 11 has dimensions that prevent it from slipping into the slot in which it is used. Further, the crown 11 is sized to accommodate the desired tie-down connector 20, as described below. The crown 11 is preferably metal, most preferably steel for heavy duty use, but may alternatively be any material with sufficient strength to retain the tie-down cords when they are tied to or over the cargo.

Figure 4:
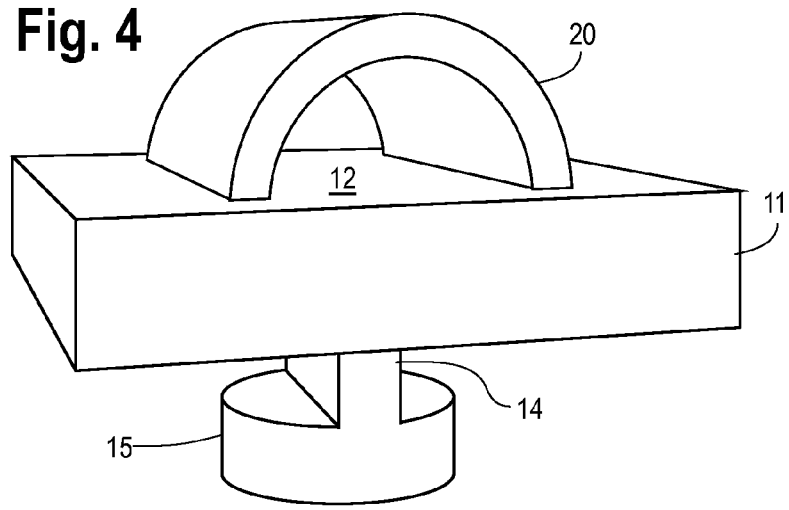
FIG. 4 is a top perspective view of the first embodiment with a tie-down connector attached to the crown.
Figure 5:
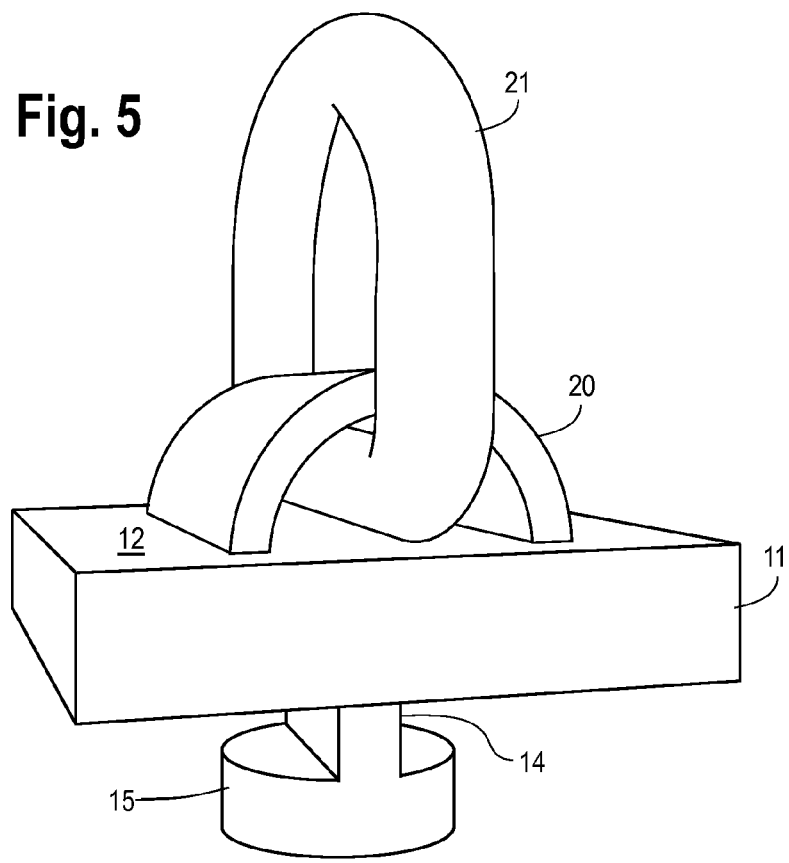
FIG. 5 is a top perspective view of the first embodiment with a d-ring passing through a tie-down connector attached to the crown.

The top surface 12 of the crown 11 is configured to receive one or more tie-down connectors. Referring to FIG. 4, the top surface 12 may be a simple planar surface onto which a tie-down connector 20 may be permanently attached, such as by welding. The connector 20 may then receive a tie-down cord, either by a direct tie of the cord through the connector 20 or by a second connector attached to the cord. Preferably, as shown in FIG. 5, a d-ring 21 is attached to the anchor 10 between an arch-shaped connector 20 and the crown 11, and the tie-downs are subsequently attached to the d-ring 21. Alternatively, the top surface 12 of the crown 11 may incorporate any suitable known or later-developed attachment mechanism, such as a snapping, locking, threaded or other mating interface that mates with a corresponding tie-down connector 20.

The projection member 14 is connected to or integral with the crown 11 at the bottom surface 13. Preferably, the projection member 14 is integral with the crown 11, being molded or machined out of a single piece material. Alternatively, the projection member 14 may be connected to the crown 11 by welding, soldering, or melt bonding. The projection member 14 is preferably centered on the bottom surface 13. The projection member 14 has at least one dimension that allows it to project into the slot. Preferably, the projection member 14 has a width W that is less than the width of the slot, so that the anchor 10 may slide or rotate in the slot. See FIG. 9. The length L of the projection member 14 is longer than the depth of the slot, allowing the key 15 to secure the anchor 10 against the underside of the carrier surface.

Figure 11:
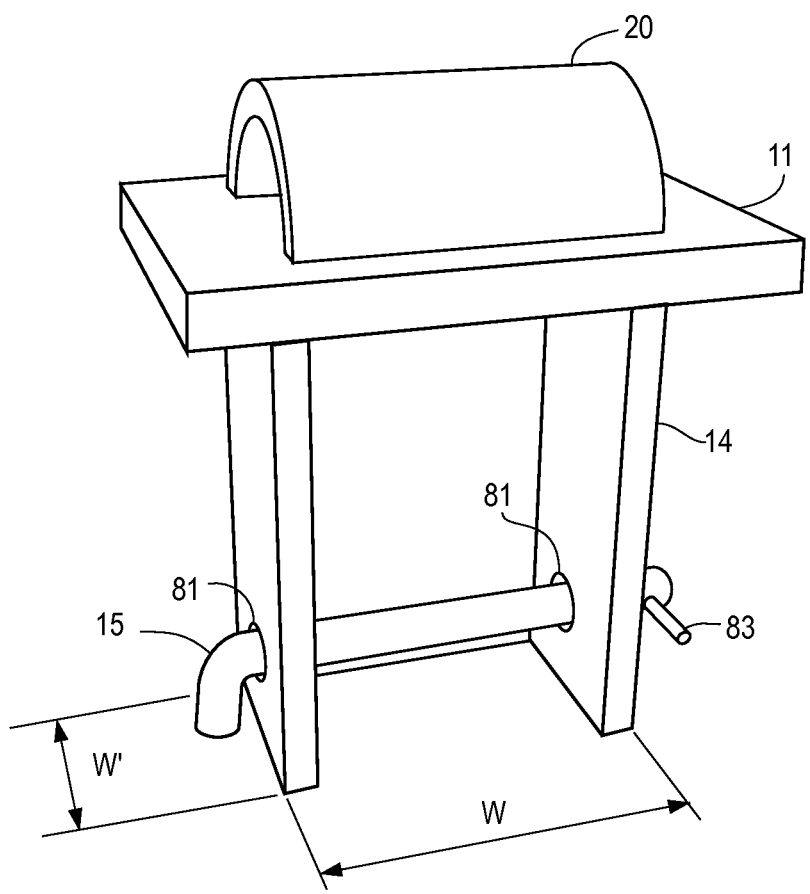
FIG. 11 is a top perspective view of a third embodiment of the invention with a tie-down connector attached to the crown.
Figure 12:
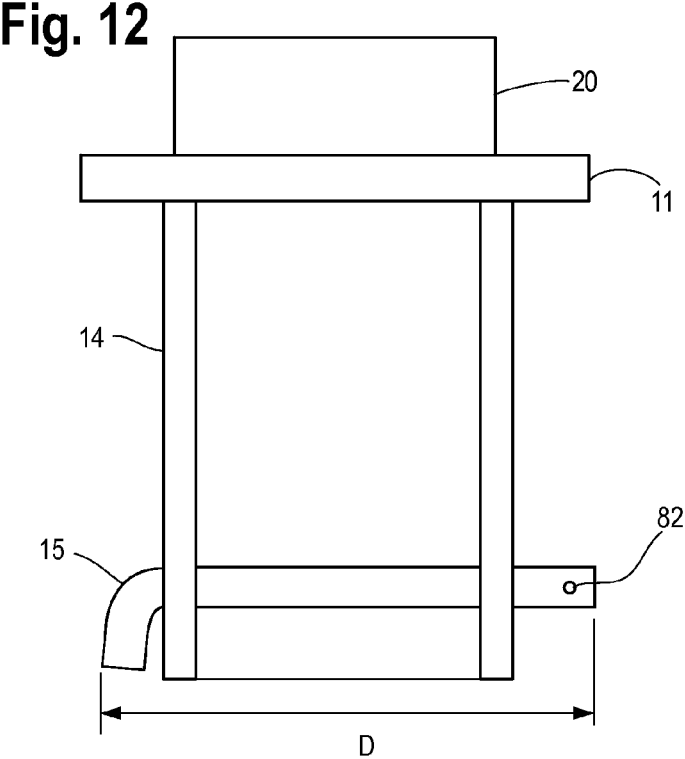
FIG. 12 is a front view of the embodiment of FIG. 11.
Figure 13:
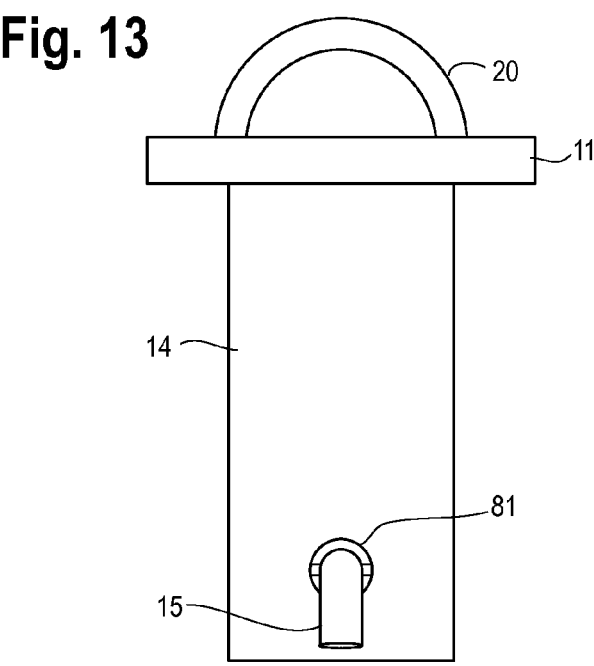
FIG. 13 is a right side view of the embodiment of FIG. 11.
Figure 14A:
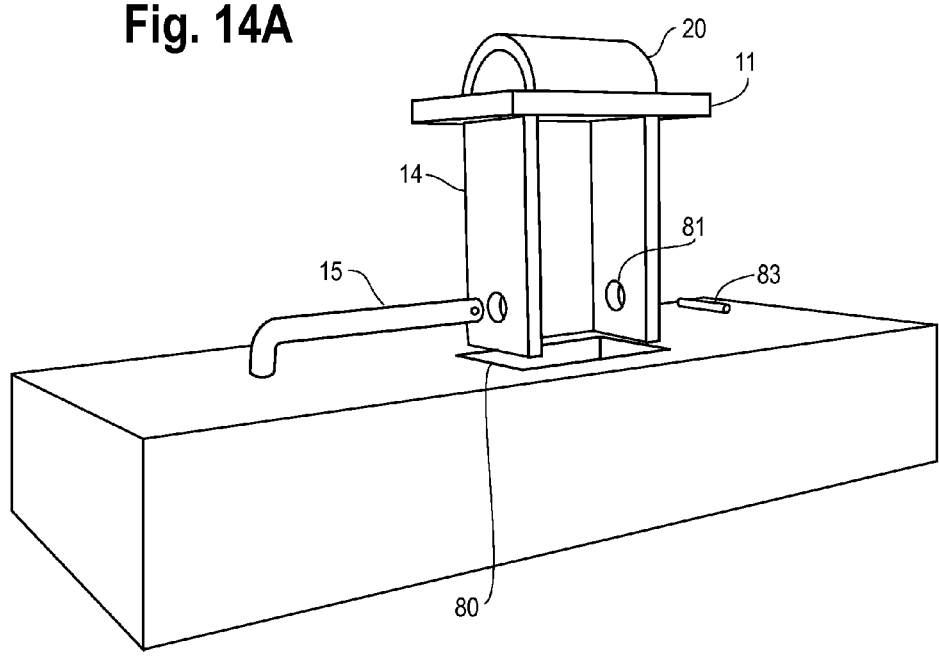
FIG. 14A is a perspective view showing the embodiment of FIG. 11 positioned over a stake pocket.
Figure 14B:
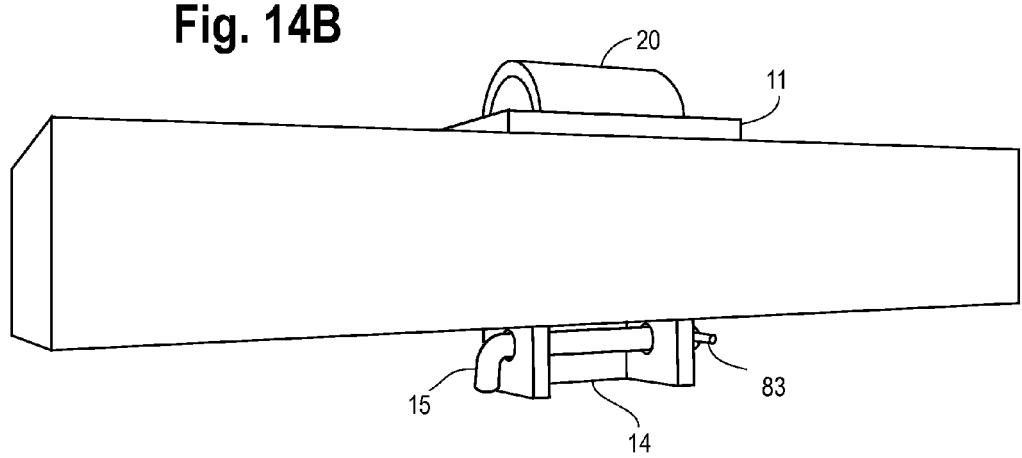
FIG. 14B is a bottom perspective view showing the embodiment of FIG. 11 in a locked position in the stake pocket.

The key 15 is permanently or removably attached to the projection member 14 at or near the end opposite the crown 11. In embodiments where the key 15 is permanently attached to the projection member 14, the attachment may be made by welding, soldering, or heat bonding. Preferably, however, the key 15 is integral with the projection member 14 in these embodiments, thus allowing the anchor 10 to be molded or machined from a single piece of material, most preferably steel. An example of removable attachment of the key 15 is illustrated in FIGS. 11 and 12 and described in detail below. The key 15 has a width D that is wider than the width of the slot at the "locked" position described below. For key slots such as those depicted in FIGS. 6A-B and 10A-B, the width D is also narrower than the width of the slot at the slot's insertion point.

With the components of the anchor 10 generally defined, reference is made to the three example embodiments illustrated by the figures, which may be used with common types of carrier surface slots. FIGS. 5 and 6A-B illustrate an anchor with a connector 20 and d-ring 21 attached, the anchor having integral components including a cylindrical key 15 that fits into the circular insertion point 61 in a key slot 60. The slot channel 62 in the key slot 60 is wider than the width W of the projection member 14 and narrower than the width D of the key 15. For structural stability and ease of manufacture, the projection member 14 is formed by molding or machining part of the cylinder that forms the key 15 to give the projection member 14 its width W. The anchor is inserted into the insertion point 61 until the crown 11 contacts the top 63 of the key slot 60. Then, the anchor slides forward or backward in the slot channel 62 until it reaches the "locked" position illustrated in FIG. 6B. In this position, the key 15 abuts the surface underneath the slot, retaining the anchor in place when force is applied to attached tie-down cords, the force being non-parallel to the key slot 60.

FIGS. 7-10B illustrate an anchor with a connector 20 attached, the anchor having integral components including a cylindrical crown 11 and projection member and an elongated key 15. The width D of the key 15 is slightly less than the length of an insertion point 71 in a t-slot 70, but long enough that it will abut the underside of the carrier surface when it is rotated into the locked position. The anchor is inserted into the insertion point 71 until the crown 11 contacts the top 73 of the t-slot 70. Then, the anchor is rotated until it reaches the "locked" position illustrated in FIG. 10B. In this position, the key 15 abuts the surface underneath the slot, retaining the anchor in place when it is put under tension from attached tie-down cords.

FIGS. 11-14B illustrate an anchor with a connector 20 attached, the anchor being designed to fit in an existing stake pocket 80. In this embodiment, the projection member 14 is a square c-channel with dimensions W and W' that are both slightly narrower than the corresponding sides of the stake pocket 80 to allow the projection member 14 to fit into the stake pocket 80. Preferably, the projection member 14 fits tightly in the stake pocket 80. The key 15 in this embodiment is a removable through-bolt that passes through bolt holes 81 in the projection member 14 and is locked in place with a pin 83 or similar clip inserted into a pin hole 82. The anchor is inserted into the stake pocket 80 and the key 15, having a length D' that is longer than the width of the stake pocket 80, is inserted and locked into place, retaining the anchor in place when it is put under tension from attached tie-down cords.

Referring now to FIGS. 15 and 15A, a vehicle carrier 100 with a cab 102 whose chassis 106 carries a tiltable platform 104. Platform 104 (which may be slidable in the direction of arrows 102a) may include side rails 104a and a winch 103. Winch 103 includes a winch cable 105 that may be connected to a winching cable guide mechanism, such as snatch block 110, which may be used to guide winching cable 105 originating in a preferred orientation during loading of a disabled vehicle 120 (or other load) onto the platform. The portion of the winch cable 105b downstream of snatch block 110 may be connected to vehicle 120 using appropriate grappling hooks 116, as shown. Snatch block 110 may be removably connected to removable anchor 10 as is well known in the art, and winching cable 105 may pass through snatch block 110 so that the cable may be guided in the desired direction. Removable anchor 10 may be removably connected to an aperture 130 in the deck, with key 15 fitting into reduced aperture 130a, and then into channel 130b, as described above.

The above description is not intended to limit the meaning of the words used in the following claims that define the invention. For example, while several possible designs have been described above, persons of ordinary skill in the art will understand that a variety of other designs still falling within the scope of the following claims may be envisioned and used. It is contemplated that these or other future modifications in structure, function or result will exist that are not substantial changes and that all such insubstantial changes in what is claimed are intended to be covered by the claims.

I claim:

1. A removable anchor for use in securing a load supported by a vehicle or trailer bed, the vehicle or trailer bed having one or more slots located on a cargo surface, each of the slots having a slot insertion shape and a slot locking shape, comprising:

a projection member having a relatively thin elongate body and a relatively thicker distal end comprising a key, the distal end comprising the key being shaped and sized to fit into only the slot insertion shape and not the slot locking shape of the slot on the cargo surface, and the body being shaped and sized to fit into the slot locking shape;

a crown attached to, or integrally forming a part of, the projection member, the crown being configured for connecting use in securing the load;

the key attached to, or integrally forming a part of, the projection member, the key having a substantially different geometric configuration than the body of the projection member and being configured to be passed into the slot insertion shape where the key is in a first, removable key position in which the anchor can be readily removed from the slot, and wherein the key may be manipulated and passed through the slot insertion shape to the slot locking shape where the projection member is guided by the slot locking shape and the key is in a second, locked key position in which the anchor is retained in the slot due to a dissimilarity in shape between the slot locking shape and the key and wherein now, upon rotation of the key, the key may not be passed through even the slot insertion shape, thereby enabling the anchor to resist an external pulling force exerted on the anchor by the crown.

2. The removable anchor of claim 1, wherein the anchor is attached to a load-securing mechanism comprising one or more tie-down connectors attached to one or more tie-down cords.

3. The removable anchor of claim 1, wherein the projection member has a width less than a width of the slot insertion shape, allowing the projection member to slide or rotate in the slot.

4. The removable anchor of claim 1, wherein the projection member has a length greater than a depth of the slot, thereby enabling the key to secure the anchor against an underside of the cargo surface adjacent the slot.

5. The removable anchor of claim 1, wherein the key is permanently attached to the projection member.

6. The removable anchor of claim 2, wherein a top surface of the crown is configured to receive the one or more tie-down connectors.

7. The removable anchor of claim 1, wherein a lower surface of the crown is configured to contact and substantially lie flush with a portion of the cargo surface adjacent the slot.

8. The removable anchor of claim 1, wherein the slot has a slot insertion area having a slot insertion width, and a slot locking area having a slot locking width, and wherein the key has a width that is wider than the width of the slot locking width when the key is in the locked position.

9. The removable anchor of claim 1, wherein the key has a width that is narrower than a width of the slot insertion shape when the key is in the removable key position.

10. The removable anchor of claim 9, wherein the key may be moved from the removable key position to the locked key position by sliding the projection member along the slot from the slot insertion shape to the slot locking shape, and then rotating the key.

* * * * *